United States Patent
Glingener

(10) Patent No.: US 7,620,326 B2
(45) Date of Patent: Nov. 17, 2009

(54) METHOD FOR TRANSMITTING AT LEAST ONE FIRST AND SECOND DATA SIGNAL IN POLARIZATION MULTIPLEX IN AN OPTICAL TRANSMISSION SYSTEM

(75) Inventor: Christoph Glingener, Jade (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 498 days.

(21) Appl. No.: 10/524,617

(22) PCT Filed: Jul. 7, 2003

(86) PCT No.: PCT/DE03/02272

§ 371 (c)(1),
(2), (4) Date: Feb. 8, 2005

(87) PCT Pub. No.: WO2004/021618

PCT Pub. Date: Mar. 11, 2004

(65) Prior Publication Data

US 2005/0265727 A1 Dec. 1, 2005

(30) Foreign Application Priority Data

Aug. 9, 2002 (DE) ............................... 102 36 603

(51) Int. Cl.
*H04B 10/00* (2006.01)
(52) U.S. Cl. .................... 398/152; 398/184; 398/205
(58) Field of Classification Search ......... 398/205–206, 398/184, 152
See application file for complete search history.

(56) References Cited

U.S. PATENT DOCUMENTS 6,580,535 B1   6/2003 Schönfelder 6,999,688 B1 * 2/2006 Hui et al. .................... 398/205
2007/0133993 A1 * 6/2007 Yee et al. ...................... 398/85

FOREIGN PATENT DOCUMENTS

| DE | 101 47 871 A1 | 4/2003 |
|---|---|---|
| DE | 101 47 892 A1 | 4/2003 |
| EP | 1 345 347 A2 | 9/2003 |
| WO | WO 02/060096 A2 | 8/2002 |

OTHER PUBLICATIONS

Bigo et. al, "10.2 Tbit/s (256×42.7Gbit/s PDM/WDM) transmission over 100km TeraLight™ fiber with 1.28bit/s/Hz spectral efficiency", Optical Fiber Communication Conference, Technical Digest Postconference Edition, Anaheim, CA, Mar. 17-22, 2001, Trends in Optics and Photonics Series, Tops, vol. 54, Washington, WA: OSA, US, vol. 1 of 4, Mar. 17, 2001, pp. PD251-PD253, XP010545710.

(Continued)

*Primary Examiner*—Agustin Bello
(74) *Attorney, Agent, or Firm*—Dickinson Wright, PLLC

(57) ABSTRACT

The invention relates to a method for transmitting at least one first and second data signal in polarization multiplex. To this end, the invention provides that, in a first step, the first data signal is, on the transmit side, modulated to a sideband of a first carrier signal for generating a first sideband-modulated signal, and the second data signal is modulated to a sideband of a second carrier signal in order to generate a second sideband-modulated signal. In a second step, the first and second sideband-modulated signal are subsequently polarized orthogonal to one another, combined to form an optical multiplex signal and transmitted. In a third step, the optical multiplex signal is, on the receive side, guided via a polarization control element to a polarization splitter that separates the transmitted optical multiplex signal into the first and second sideband-modulated signal. In a fourth step, the first sideband-modulated signal is converted into a first electrical signal and/or the second sideband-modulated signals are/is converted into a second electrical signal. In a fifth step, the first and/or second electrical signal are/is evaluated and at least one control signal for controlling the polarization control element is derived on the basis of this evaluation.

11 Claims, 3 Drawing Sheets

OTHER PUBLICATIONS

Mike Sieben, Jan Conradi and David E. Dodds, "Optical Single Sideband Transmission at 10 Gb/s Using Only Electrical Dispersion Compensation", Journal of Lightwave Technology, vol. 17, No. 10, Oct. 1999, pp. 1742-1749.

F. Heismann, P.B. Hansen, S.K. Korotky, G. Raybon, J.J. Veselka and M.S. Whalen, "Automatic polarisation demultiplexer for polarisation-multiplexed transmission systems", Electronics Letters, IEE Stevenage, GB, vol. 29, No. 22, Oct. 28, 1993, pp. 1965-1966, XP000421562.

Paul M. Hill, Robert Olshansky and W.K. Burns, "Optical Polarization Division Multiplexing at 4 Gb/s", IEEE Photonics Technology Letters, vol, 4, No. 5, May 1992, pp. 500-502.

C.X. Yu, et al., "Vestigial sideband filtering at 10Gbit/s using 12.5 GHZ channel-spacing demux", Electronic Letters, Feb. 28, 2002, pp. 237-238, vol. 38, No. 5.

* cited by examiner

METHOD FOR TRANSMITTING AT LEAST ONE FIRST AND SECOND DATA SIGNAL IN POLARIZATION MULTIPLEX IN AN OPTICAL TRANSMISSION SYSTEM

CROSS REFERENCE TO RELATED APPLICATIONS

This application is the US National Stage of International Application No. PCT/DE2003/002272, filed Jul. 7, 2003 and claims the benefit thereof. The International Application claims the benefits of German application No. 10236603.9 filed Aug. 9, 2002, both applications are incorporated by reference herein in their entirety.

FIELD OF THE INVENTION

The invention relates to a method for transmitting at least one first and second data signal in polarization multiplex in an optical transmission system.

BACKGROUND OF THE INVENTION

In optical transmission systems, the transmission capacity of an optical transmission system which already exists can be enhanced by transmitting the optical data signals in polarization multiplex. For the purpose of transmitting optical data signals in polarization multiplex, in each case two carrier signals are generated with the same wavelength in at least one transmission arrangement, each of them being modulated by a data signal. Here, the first and second modulated signals are polarized orthogonally to each other. The orthogonally polarized modulated signals are combined into one optical polarization-multiplexed signal. This optical polarization-multiplexed signal is injected into the optical transmission fiber and is transmitted along the optical transmission link to a receiving unit. At the receiving end, the two orthogonally polarized modulated signals are recovered from the polarization-multiplexed signal on the basis of their wavelength and polarization.

In this situation, the retrieval of the two orthogonally polarized modulated signals from the polarization-multiplexed signal represents one of the problems in the polarization-multiplexed transmission of optical data signals. For this purpose a feedback criterion must be determined, from the optical multiplex signal which is transmitted, for use in controlling a polarization control element arranged at the receiving end. With the help of this polarization control element, controlled by reference to the appropriate feedback criterion, and for example a downstream polarization splitter or a polarization filter, the two modulated signals which are polarized orthogonally to each other are separated.

Various feedback criteria are known for controlling the separation of the two orthogonally polarized signals at the receiving end. The publication "Optical polarization division multiplexing at 4GB/S" by Paul M. Hill et al., IEEE Photonics Technology Letters, Vol. 4 No. 5, May 1992, discloses the use of coherent techniques in combination with pilot tones for the purpose of reconstructing or separating, as applicable, polarization-multiplexed optical signals. In addition, the publication "Fast Automatic Polarization Control System", Heismann and Whalen, IEEE Photonics Technology Letters, Vol. 4 No. 5, May 1992, discloses a separation of polarization-multiplexed optical signals by reference to a correlation signal generated from the clock pulse which is recovered together with the optical signals received. In addition, the German patent application 10147892.5 discloses a frequency shift method for separating polarization-multiplexed optical data signals at the receiving end, in which use is made at the transmitting end of two carrier signals which have a differential frequency and, for the purpose of separating the two data signals at the receiving end, the spectrum of the data signals transmitted at the differential frequency is analyzed for the purpose of controlling a polarization control element.

In F. Heismann et al., "Automatic polarization demultiplexer for polarization-multiplexed transmission systems", Electronics Lett. (1993) Vol. 29, No. 22, pp 1965/6, a fully automatic polarization demultiplexer for an optical polarization-multiplexed transmission system is proposed. The demultiplexer consists of an electro-optical polarization converter and a simple fiber-optic polarization splitter. The polarization converter continuously converts any arbitrary and fluctuating polarization states at the end of the optical transmission link into a fixed polarization state, and they are then separated out spatially by the polarization splitter.

S. Bigo et al., "10.2 Tbit/s (256x42.7 Gbit/s PDM/WDM) transmission over 100 km TeraLight™ fiber with 1.28 bit/s/Hz spectral efficiency", OFC 2001 Tech. Digest, Postconference Edition, pp. PD25-1-3, presents a transmission system with high spectral efficiency, incorporating both polarization multiplexing and also wavelength multiplexing. In this, the transmission capacity is increased by the fact that channels which are located in the C and L bands are mutually combined and are so arranged that they can be better isolated spectrally by means of vestigial sideband filtering in the receiver. Here, one of the two sidebands of the transmission signal is filtered out at the receiving end of the transmission system.

In addition to this, the publication by Mike Sieben et al., "Optical Single Sideband Transmission at 10 Gb/s Using Only Electrical Dispersion Compensation", Journal of Lightwave Technology, Vol. 17, No. 10, October 1999 discloses a method for single-sideband transmission of optical signals, in which an optical single-sideband signal is generated at the transmitting end from a digital baseband signal with the help of at least one Mach-Zehnder modulator, using a Hilbert transformation. By the transmission of a single sideband, the of fiber chromatic dispersion is reduced, and the optical bandwidth is increased.

SUMMARY OF THE INVENTION

The object of the invention is to be seen as the specification of a new type of method for the transmission of high bit-rate optical signals in polarization multiplex with an increased transmission bandwidth.

This object is achieved by the claims.

The essential advantage of the method in accordance with the invention is to be seen in that, for the purpose of transmitting at least one first and second data signal in polarization multiplex in an optical transmission system, in a first step at the transmitting end the first data signal is modulated onto a sideband of a first carrier signal to generate a first sideband modulated signal and the second data signal is modulated onto a sideband of a second carrier signal to generate a second sideband modulated signal. In a second step, the first and second sideband modulated signals are polarized orthogonally to each other, and are combined into one optical multiplex signal and transmitted. In a third step, at the receiving end, the optical multiplex signal is fed via a polarization control element to a polarization splitter which separates out the optically multiplexed signal which was transmitted into the first and second modulated signals. In addition, in a fourth step, the first sideband modulated signal is converted to a first electrical signal and/or the second sideband modulated signal is converted to a second electrical signal and, in a fifth step, the first and/or the second electrical signal is analyzed and, dependent on it, at least one control signal is derived for the purpose of controlling the polarization control element. Advantageously, the method according to the invention enables data signals to be transmitted with a high spectral efficiency. The combination according to the invention of single sideband or vestigial sideband modulation, as applicable, together with the optical polarization-multiplexing technique results in advantageously increased tolerance ranges for the optical transmission system with respect to the non-linear effects of, for example, fiber chromatic dispersion.

It is advantageous that the transmission of the two optical data signals makes use of two carrier signals which differ by a differential frequency. At the transmitting end, for the purpose of analyzing the first and/or the second electrical signal, the spectral component of the first and/or the second electrical signal is determined at the differential frequency. For the purpose of effecting exact separation at the receiving end of the first and second sideband modulated signals, transmitted in polarization multiplex, at least one polarization control element arranged at the receiving end is controlled, taking advantage of the characteristic of an opto-electric converter, for example a photodiode, that it raises to a power of two, to provide a feedback criterion. Because of this 'squaring' characteristic, the electrical spectrum of the electric signal delivered at the output from the opto-electric converter contains unwanted spectral components if the separation of the two sideband modulated signals transmitted in polarization multiplex, carried out with the help of the polarization splitter, is not exact. These spectral components, which lie at the differential frequency, arise in both the first and the second electrical signals. The amplitude of these spectral components is analyzed for the purpose of forming at least one control signal, for controlling the polarization control element. In this case, the polarization control element is, for example, controlled with the help of the one or more control signals in such a way that the spectral component arising at the differential frequency is minimized. Using a sharp feedback criterion of this type it is possible to effect the most exact possible separation at the receiving end of the sideband modulated signals transmitted in polarization multiplex.

It is advantageous if the first or the second sideband modulated signal is delayed at the transmitting end, which achieves an effective decorrelation of the first and second sideband modulated signals. By this means, the sharpness of the feedback criterion is further increased.

A further advantage of the invention can be seen in the fact that for the purpose of distinguishing between the first and the second electrical signal, at least one pilot tone signal is superimposed on the first and/or the second carrier signal at the transmitting end. As an advantageous alternative, a pilot tone with a defined frequency is superimposed on the first and/or the second sideband modulated signal, by reference to which, after the first and second sideband modulated signals have been separated at the transmitting end with the help of the polarization splitter, and the conversion into a first and a second electrical signal, it is possible to effect an unambiguous identification of the first and second electrical signals themselves. Alternatively, for the purpose of distinguishing between the first and second electrical signal, the first and second data signals can be transmitted with different bit transmission rates or data formats. In a further alternative form of embodiment, the first and second data signals have different bit transmission rates, so that at the receiving end each of the electrical signals can advantageously be identified by reference to the assigned transmission rate.

Additional advantageous embodiments of the method in accordance with the invention will be found in the dependent claims.

Exemplary embodiments of the method in accordance with the invention and of the optical transmission system in accordance with the invention are explained in more detail below by reference to a schematic circuit diagram and several diagrams.

DETAILED DESCRIPTION OF THE INVENTION

Figure 1:
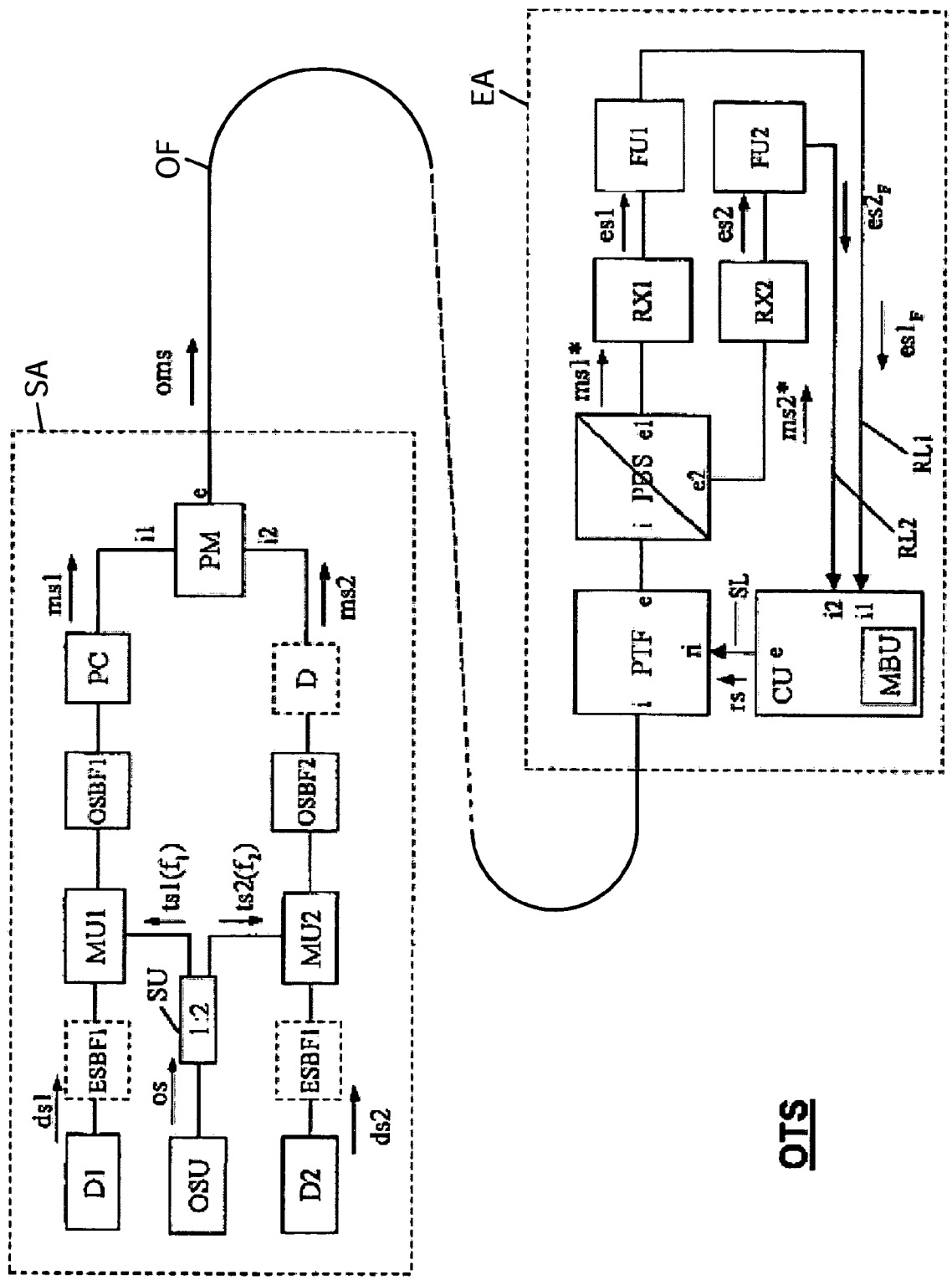
FIG. 1 shows an example of an optical transmission system for the transmission of at least one first and one second data signal modulated onto a sideband of carrier signals, in polarization multiplex.

FIG. 1 shows a schematic diagram of a typical optical transmission system OTS, which has a transmission arrangement SA and a receiving arrangement EA connected to it via an optical transmission fiber OF. The transmission arrangement SA includes, for example, a first and a second data unit D1, D2, an optical signal generation unit OSU, an optical splitter unit SU, a first and a second modulator unit MU1, MU2, a first and a second optical sideband filter unit OSBF1, OSBF2, a polarization controller PC and a polarization multiplexer PM. The receiving arrangement EA incorporates a polarization control element PTF, a polarization splitter PBS, a first and a second opto-electric converter RX1, RX2, a first and a second filter unit FU1, FU2, together with a control unit CU. The control unit CU has in addition a measurement and analysis unit MBU.

The first data unit D1 of the transmitting arrangement SA is connected to the first modulator unit MU1, which is connected via the first optical sideband filter unit OSBF1 and the polarization controller PC to the first input i1 of the polarization multiplexer PM. The second data unit D2 is connected to the second modulator unit MU2, which is connected via the second optical sideband filter unit OSBF2, and optionally via a delay element D, to the second input e2 of the polarization multiplexer PM. The optional nature of the delay element D is indicated in FIG. 1 by it being drawn in dashed lines. In addition to this, a first and a second electrical sideband filter unit ESBF1, ESBF2, may also be optionally provided, these being connected in respectively between the first data unit D1 and the first multiplexer MU1 or between the second data unit D2 and the second multiplexer MU2. There is a choice of using either the first and second electrical sideband filter units ESBF1, ESBF2 or the first and second optical sideband filter units OSBF1, OSBF2, for the purpose of generating respectively electrical or optical sideband signals.

The optical signal generation unit OSU is connected via the optical splitter unit SU, which typically has a splitting ratio of 1:2, to the first and second modulator units MU1, MU2.

Connected to the output e of the polarization multiplexer PM is the optical transmission fiber OF, the output from which is fed to the input i on the polarization control element PTF of the receiving arrangement EA. Here, the optical transmission fiber OF may incorporate several optical fiber transmission sections—not shown in FIG. 1.

The output e on the polarization control element PTF is connected to the input i of the polarization splitter PBS. The first output e1 of this is connected to the first opto-electric converter RX1 and its second output to the second opto-electric converter RX2. The first and second opto-electric converters RX1, RX2 are connected respectively to the first and second filter units FU1, FU2. The first filter unit FU1 and the second filter unit FU2 are connected respectively, for example via a first and second control line RL1, RL2 respectively, to the first and second inputs i1, i2 of the control unit CU, the output e from which is connected via a control line SL to the control input ri on the polarization control element PTF. For the purpose of analyzing the received electrical signals, the control unit CU has for example a measurement and analysis unit MBU.

An optical signal os is generated in the optical control unit OSU, this optical signal taking the form of a "white light signal" having a constant frequency or an optical pulse signal. The optical signal os is transmitted to the optical splitter unit SU and is split into a first and a second carrier signal ts1, ts2. Here, the first and second carrier signals ts1, ts2 have the same frequency $f_1$, $f_2$. Alternatively, two separate optical signal generation units OSU1,2—not shown in FIG. 1—can be provided, for use in generating first and second carrier signals ts1, ts2, these being at a first and a second frequency $f_1$, $f_2$, which are offset by a differential frequency $\Delta f$. The first carrier signal ts1 is transmitted to the first modulator unit MU1 and the second carrier signal ts2 to the second modulator unit MU2.

In the first data unit D1, a first data signal ds1 is generated in a first data format—for example in the return-to-zero (RZ) data format—this being fed from the first data unit D1 to the first modulator unit MU1. The first modulator unit MU1 modulates the first data signal ds1 onto a sideband of the first carrier signal ts1, thereby generating a first sideband modulated signal ms1, which is routed via the first optical sideband filter unit OSBF1 and the polarization controller PC to the first input i1 on the polarization multiplexer PM.

In an analogous way to this, a second data signal ds2 is generated in the second data unit D2, also in the first data format or in a second data format—for example the non-return-to-zero (NRZ) data format—and is transmitted from the second data unit D2 to the second modulator unit MU2. In the second modulator unit MU2, the second data signal ds2 is modulated onto a sideband of the second carrier signal ts2, and hence a second sideband modulated signal ms2 is formed, which is fed via the second optical sideband filter unit OSBF1 and optionally via the delay element D to the second input i2 on the polarization multiplexer PM.

Here, the modulation of the first and second carrier signal ts1, ts2 respectively by the first or second data signal ds1, ds2, can be effected using either single sideband modulation or vestigial sideband modulation. The transmission characteristics of the first and second electrical sideband filter units ESBF1, ESBF2 or of the first and second optical sideband filter units OSBF1, OSBF2, as applicable, are adapted for the sideband modulation method used in each case. In this way, the sideband required for the transmission of the first or second data signal ds1, ds2, as applicable, is filtered out before or after the modulation, using respectively the first and second electrical sideband filter unit ESBF1, ESBF2 or the first and second optical sideband filter unit OSBF1, OSBF2, whereby the sideband modulation is effected, for example, with the help of a Hilbert transform—in this connection see the publication by Mike Sieben et al., "Optical Single Sideband Transmission at 10 Gb/s Using Only Electrical Dispersion Compensation", Journal of Lightwave Technology, Vol. 17, No. 10, Oct. 1999.

When the first and second sideband modulated signals ms1, ms2, are generated, their polarizations are preset in such a way that they are polarized orthogonally to each other, and hence can be transmitted in polarization multiplex over the optical transmission fiber OF to the receiving arrangement EA. For the purpose of orthogonalizing the polarization of the first and second modulated signals ms1, ms2, polarization controllers PC can for example be provided at the receiving end. If the first and second carrier signals ts1, ts2 are generated by two separate optical signal generation units OSU, then a polarization controller PC is not absolutely necessary because it is possible, with the help of modern optical signal generation units OSU, to generate optical signals which already have a prescribed polarization.

In the exemplary embodiment, the polarization controller PC ensures there is an orthogonal polarization relationship between the first and the second sideband modulated signals ms1, ms2, whereby either as an alternative or additionally a polarization controller PC can be arranged between the second optical sideband filter unit OSFB2 and the polarization multiplexer. Optionally, the delay element D delays the second sideband modulated signal ms2, by which means the first and second sideband modulated signals ms1, ms2 can be decorrelated at the transmitting end.

With the help of the polarization multiplexer PM, the first and second sideband modulated signals ms1, ms2 are combined to form one optical multiplexed signal oms, which is fed into the optical transmission fiber OF at the output e from the polarization multiplexer PM. The first and the second sideband modulated signals ms1, ms2 are then transmitted in polarization-multiplexed form over the optical transmission fiber OF in the form of the optical multiplex signal oms.

In the receiving arrangement EA, the optical multiplex signal oms is fed to the input i of the polarization control element PTF, which can be used to control the polarization of the transmitted first and/or second sideband modulated signals ms1, ms2 within the optical multiplex signal oms. After the polarization of the transmitted first and/or second modulated signals ms1, ms2 has been adjusted within the optical multiplex signal oms, this optical multiplex signal oms is fed to the input i of the polarization splitter PBS, which breaks the optical multiplex signal oms into the first sideband modulated signal ms1* and the second sideband modulated signal ms2*. The accuracy with which the optical multiplex signal oms is broken into the first sideband modulated signal ms1* and the second sideband modulated signal ms2* depends on the orthogonality of the polarization of the two signals ms1*, ms2*.

The first sideband modulated signal ms1* is delivered to the first output e1 of the polarization splitter PSB, and is routed to the first opto-electrical converter RX1. In an analogous way to this, the second sideband modulated signal ms2* is delivered to the second output e2 of the polarization splitter PSB, and is transmitted to the second opto-electrical converter RX2.

The first and second sideband modulated signals ms1*, ms2* thus recovered are converted by the first and second opto-electric converters RX1, RX2 respectively into first and second electrical signals es1, es2, which are routed respectively to the first and the second filter units FU1, FU2.

With the help of the first and the second filter units FU1, FU2, a selected spectral component of the first and the second electrical signals es1, es2, is filtered out, and the filtered first and second electrical signals $es1_F$, $es2_F$ are transmitted via the first and second control lines RL1, RL2 to the control unit CU.

In the control unit CU, the measurement and analysis unit MBU is used to determine the amplitude of the filtered first and/or second electrical signals $es1_F$, $es2_F$, and the amplitude(s) then analyzed. On the basis of the result of the analysis, at least one control signal rs is formed for use in controlling the polarization control element PTF, and this is fed via the control line SL to the control input ri on the polarization control element PTF. For the purpose of forming the control signal rs it is possible to measure and analyze, for example, the voltage amplitude or the current amplitude or the power amplitude of the filtered first and/or second electrical signal $es1_F$, $es2_F$. By this means, the polarization of the optical multiplex signal oms is adjusted by the polarization control element PTF, which is controlled by the control signal rs, in such a way that the amplitude of the filtered first and/or second electrical signal $es1_F$, $es2_F$, determined by the measurement and analysis unit MBU of the control unit CU, becomes minimal. This means that the receiving arrangement EA, consisting of the polarization control element PTF and the polarization splitter PBS for separating out the first sideband modulated signal ms1 and the second sideband modulated signal ms2, is optimally adjusted.

Here, the control by the polarization control element PTF can be effected in different ways, for example by pilot tone methods, correlation methods and interference methods. Particularly preferred is control in accordance with the frequency shift method (in this connection see the preamble to the German patent application 10147892.5). With control of this type, the first and second carrier signals ts1, ts2 of the first and second sideband modulated signals ms1, ms2 have a differential frequency $\Delta f$. Because of the squaring characteristics of the first and second opto-electric converters RX1, RX2, a spectral component is generated at the differential frequency $\Delta f$. If the polarization control element PTF is optimally adjusted, these spectral components of the first and second electrical signals es1, es2 have a minimum, or are no longer measurable, as applicable. Hence, the first and second filter units FU1, FU2 filter out these relevant spectral components of the first and second electrical signals es1, es2, at the differential frequency $\Delta f$, and the amplitudes of the filtered first and/or second electrical signals $es1_F$, $es2_F$, are determined by the measurement and analysis unit MBU. For this purpose, the first and second filter units FU1, FU2 are, for example, arranged as band pass filters with a differential frequency $\Delta f$ corresponding to the central frequency $f_M$ (in the exemplary embodiment under consideration $f_M$=10 GHz, for example) and a bandwidth of, for example 1 GHz around the differential frequency. Typical values for the differential frequency $\Delta f$ of the first and second carrier signals ts1, ts2 lie in a range greater than one Gigaherz.

An exact separation of the first and second sideband modulated signals ms1, ms2, which are transmitted with polarizations orthogonal to each other, is thus realized at the receiving end by the arrangement shown in FIG. 1.

FIGS. 2a to 2d show several diagrams of typical power spectra or distributions PSD, as applicable, plotted against the frequency f, for the first and second optical sideband modulated signals ms1, ms2. By way of example, this is shown for the transmission of two optical data signals ds1, ds2, which are in the NRZ data format, using the single sideband modulation method at a transmission rate of 10 Gbit/sec in each case. The first optical sideband modulated signal ms1 is shown in each case as a continuous line, and the second optical sideband modulated signal ms2 is shown in each case as a dotted line.

Figure 2A:
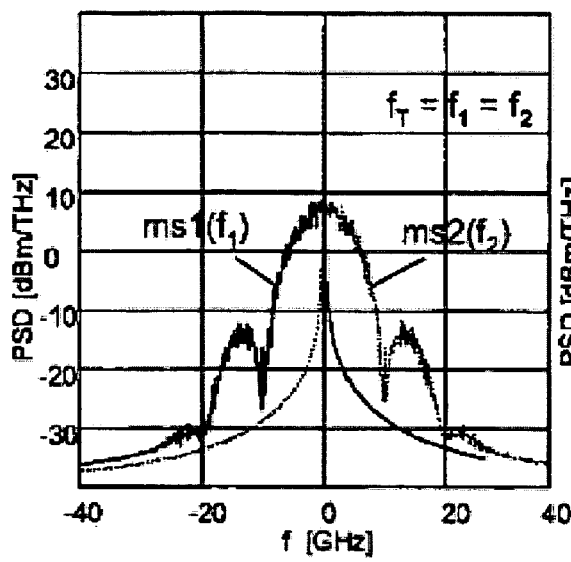
FIGS. 2a-d show examples of the power spectra of the first and second sideband modulated signals.

FIG. 2a shows, by way of example, the power distribution PSD against the frequency f for a first and a second sideband modulated signal ms1, ms2, for which the first and second carrier signals ts1, ts2 respectively, have the same frequency $f_T=f_1=f_2$. In addition, the two single sidebands selected for the transmission of the first and second data signals, ds1, ds2, are mirror symmetrical.

Figure 2B:
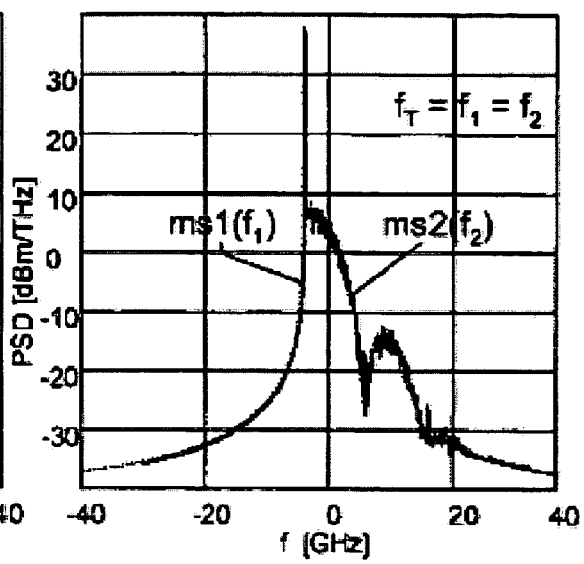

In FIG. 2b the first and second sideband modulated signals ms1, ms2, again have respectively a first and a second carrier signal ts1, ts2, with the same frequency $f_T=f_1=f_2$, whereby the first and data signal ds1, ds1, are modulated onto the identical single sideband.

Figure 2C:
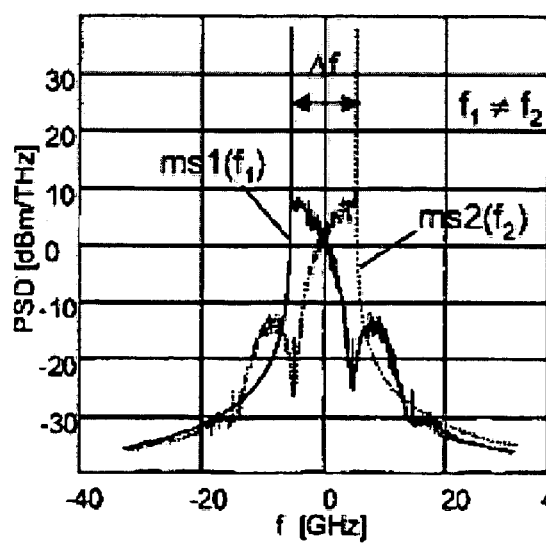
Figure 2D:
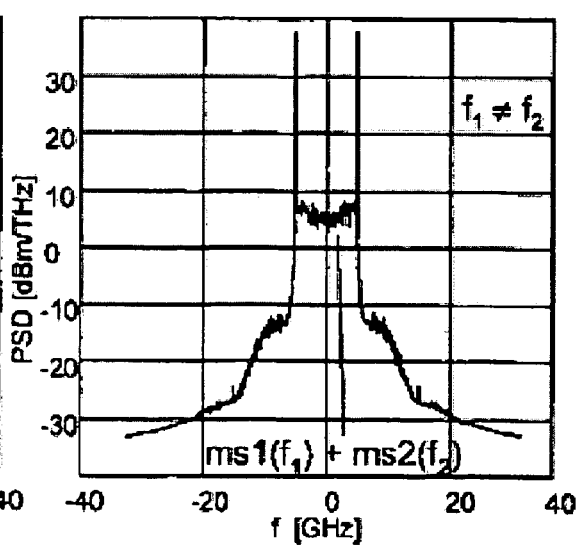

FIG. 2c shows the power distribution PSD of the first and second optical sideband modulated signals ms1, ms2, against the frequency f for the case in which the first and second carrier signals ts1, ts2, are offset by a differential frequency $\Delta f$, and FIG. 2d shows the resulting spectrum for the application situation shown in FIG. 2c.

Figure 3:
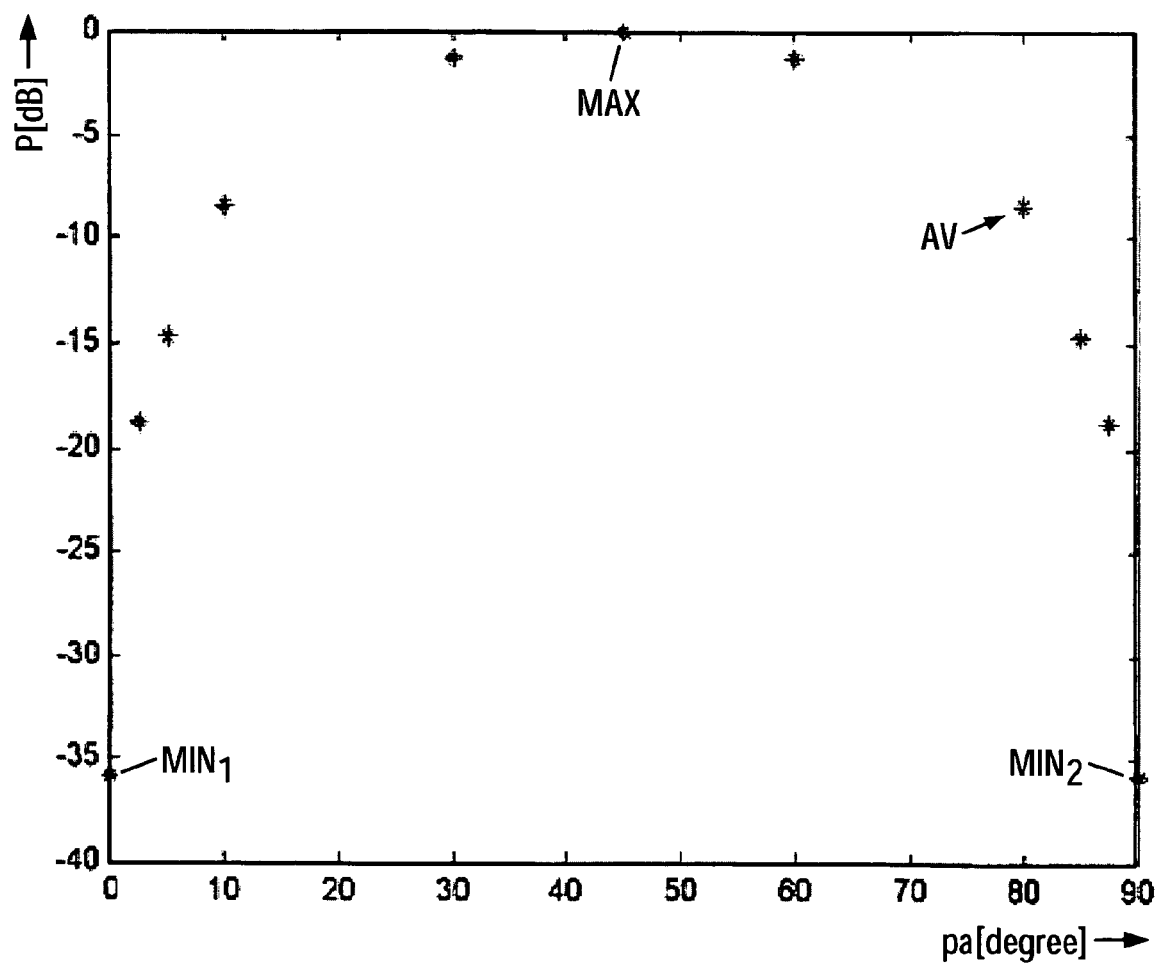
FIG. 3 shows a graph of the amplitude of the spectral component determined at the differential frequency as a function of the angle of polarization.

FIG. 3 is a diagram showing on a logarithmic scale [dB] a graph of the amplitude AV of the spectral component determined, for example the power amplitude of the filtered first and/or electrical signal $es1_F$, $es2_F$, as a function of the polarization angle pa, when there is a frequency difference $\Delta f$=10 GHz between the two carrier signals ts1, ts2. The abscissa of the plot in this diagram is the polarization angle pa, and the ordinate is the amplitude P. The graph of the amplitude AV exhibits a maximum MAX at a polarization angle of pa=45°, i.e. for a polarization offset between the first and second electrical signals es1, es2, of 45° the spectral component at the differential frequency $\Delta f$ which arises due to the squaring characteristic of the first and/or second opto-electrical converter RX1, RX2 has a maximum MAX. This maximum MAX for the spectral component at the differential frequency $\Delta f$ declines with both an increasing and a decreasing polarization offset between the first and second electrical signals es1, es2, and reaches a first minimum $MIN_1$ at 0° and a second minimum $MIN_2$ at 90°. At the first and second minima, $MIN_1$, $MIN_2$, the first and second sideband modulated signals ms1, ms2, transmitted within the optical modulation signal oms, have an optimally orthogonal polarization, so that they can be almost perfectly separated using the polarization splitter PBS. Here, when the first minimum $MIN_1$ occurs at a polarization angle of pa=0° the modulated signal with one polarization, for example the first modulated signal ms1, is perfectly captured, and when the second minimum $MIN_2$ occurs at a polarization angle of pa=90° the modulated signal with the other polarization, for example the second modulated signal ms2, is perfectly captured. All other polarization angles pa are unwanted for the control, and lead to crosstalk when the first and second modulated signals ms1, ms2 are separated out.

The delay, for example to the second sideband modulated signal ms2, effected with the help of the delay element D which is provided optionally in the transmission arrangement SA, gives the feedback criterion shown in FIG. 3 even greater contrast, by which means an even sharper control signal rs can be formed in the control unit CU. To this end, the first or second sideband modulated signal ms1, ms2, can optionally be delayed with the help of a further delay element D.

In addition, both the first and/or the second filtered electrical signal $es1_F$, $es2_F$, can be analyzed for the purpose of forming at least one control signal rs.

In addition to the above, it is possible to carry out an additional filtering of the first and second electrical signals es1, es2, at other frequencies apart from the differential frequency Δf, using the first and second filter units FU1, FU2 or further filter units, in order to obtain further data about the polarization of the first and second electrical signal es1, es2. These additional items of data can then be further processed for the purpose of increasing the contrast of the one or more control signals rs.

For the purpose of distinguishing at the receiving end between the first and second electrical signals es1, es2, separated out by means of the polarization splitter PBS, the first and the second data signals ds1, ds2, can be transmitted at different bit transmission rates, or alternatively at the transmission end at least one pilot tone signal can be superimposed on the first and/or the second carrier signals ts1, ts2, or on the first and second modulated signals ms1, ms2. In this situation, the first and second electrical signals es1, es2, can be identified as such, either by the determination at the receiving end of the bit transmission rate of each of the electrical signals es1, es2, or by the identification at the receiving end of the pilot tone signal, and can then be subject to further signal-specific processing.

In addition to the above, it is possible at the receiving end to distinguish the first and second electrical signals es1, es2, separated out with the help of the polarization splitter PBS, by the use of different bit transmission rates for the first and second data signals ds1, ds2. Alternatively, it is also possible to transmit the first and second data signals ds1, ds2 in different data formats, for example RZ and NRZ, for the purpose of distinguishing them at the receiving end.

For the purpose of further raising the bandwidth efficiency of the optical transmission system OTS, wavelength multiplexing technologies can be used.

The invention claimed is:

1. A method for transmitting a first and a second data signal as a polarization multiplex signal in an optical transmission system, comprising:
    modulating at the transmitting end the first data signal onto a first optical carrier signal and generating a first single sideband modulated signal;
    modulating at the transmitting end the second data signal onto a second optical carrier signal, which has the same optical carrier frequency or even differs by a differential frequency (Δf) from the first carrier frequency, and generating a second single sideband modulated signal such that the spectra of the first and the second sideband modulated signals overlap, by which means the transmission bandwidth is reduced;
    orthogonally polarizing the first and the second sideband modulated signals to each other;
    combining the first and the second sideband modulated signals into the optical polarization multiplex signal with overlapping orthogonal spectra including both optical carriers;
    transmitting the optical polarization multiplex signal;
    feeding at the receiving end the transmitted optical polarization multiplex signal via a polarization control element to a polarization splitter, which separates the optical polarization multiplex signal into the first and the second sideband modulated signals;
    converting the first sideband modulated signal to a first electrical signal and converting the second sideband modulated signal to a second electrical signal;
    analyzing at least one of the first and the second electrical signal; and
    dependent on the analyzing result, deriving at least one control signal for controlling the polarization control element.

2. The method according to claim 1, wherein the differential frequency (Δf) is greater than one Gigahertz, whereas the carrier frequency of an upper sideband modulated signal is lower than the carrier frequency of the lower sideband modulated signal.

3. The method according to claim 1, wherein the sideband modulation is a single sideband modulation or a vestigial sideband modulation.

4. The method according to claim 1, wherein for a second carrier signal which differs from the first carrier signal by a differential frequency (Δf), the spectral component of the first and/or the second electrical signal at the receiver is determined at the differential frequency (Δf) for controlling a polarization control element.

5. The method according to claim 2, wherein the amplitude of the first and/or the second electrical signal is controlled to a minimum at the differential frequency (Δf).

6. The method according to claim 1, wherein the first or second sideband modulated signal is delayed at the transmitting end for the purpose of decorrelation.

7. The method according to claim 1, wherein the first or second sideband modulated signal is delayed at the transmitting end for the purpose of decorrelation.

8. The method according to claim 1, wherein for the purpose of distinguishing the first and second electrical signals, at least one pilot tone signal is superimposed at the transmitting end on the first and/or the second carrier signal or the sideband modulated signal.

9. The method according to claim 1, wherein the first and second data signals are transmitted at different bit transmission rates.

10. The method according to claim 1, wherein the first and second data signals are transmitted in different data formats.

11. The method according to claim 1, wherein the optical transmission system is operated in wavelength multiplex mode.

* * * * *

UNITED STATES PATENT AND TRADEMARK OFFICE
CERTIFICATE OF CORRECTION

PATENT NO.      : 7,620,326 B2                            Page 1 of 1
APPLICATION NO. : 10/524617
DATED           : November 17, 2009
INVENTOR(S)     : Christoph Glingener It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-sixth Day of October, 2010

David J. Kappos
*Director of the United States Patent and Trademark Office*